Figure 1:
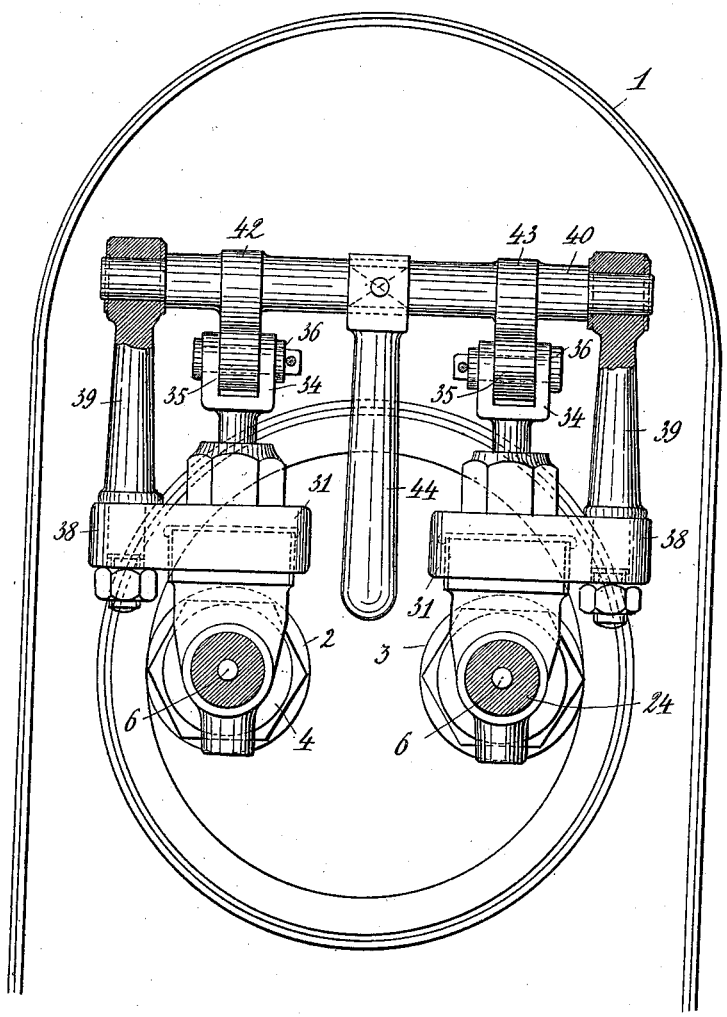

P. LULLI.
REGULATING DEVICE FOR GAS MIXERS.
APPLICATION FILED MAR. 10, 1908.

975,444.

Patented Nov. 15, 1910.
3 SHEETS—SHEET 1.

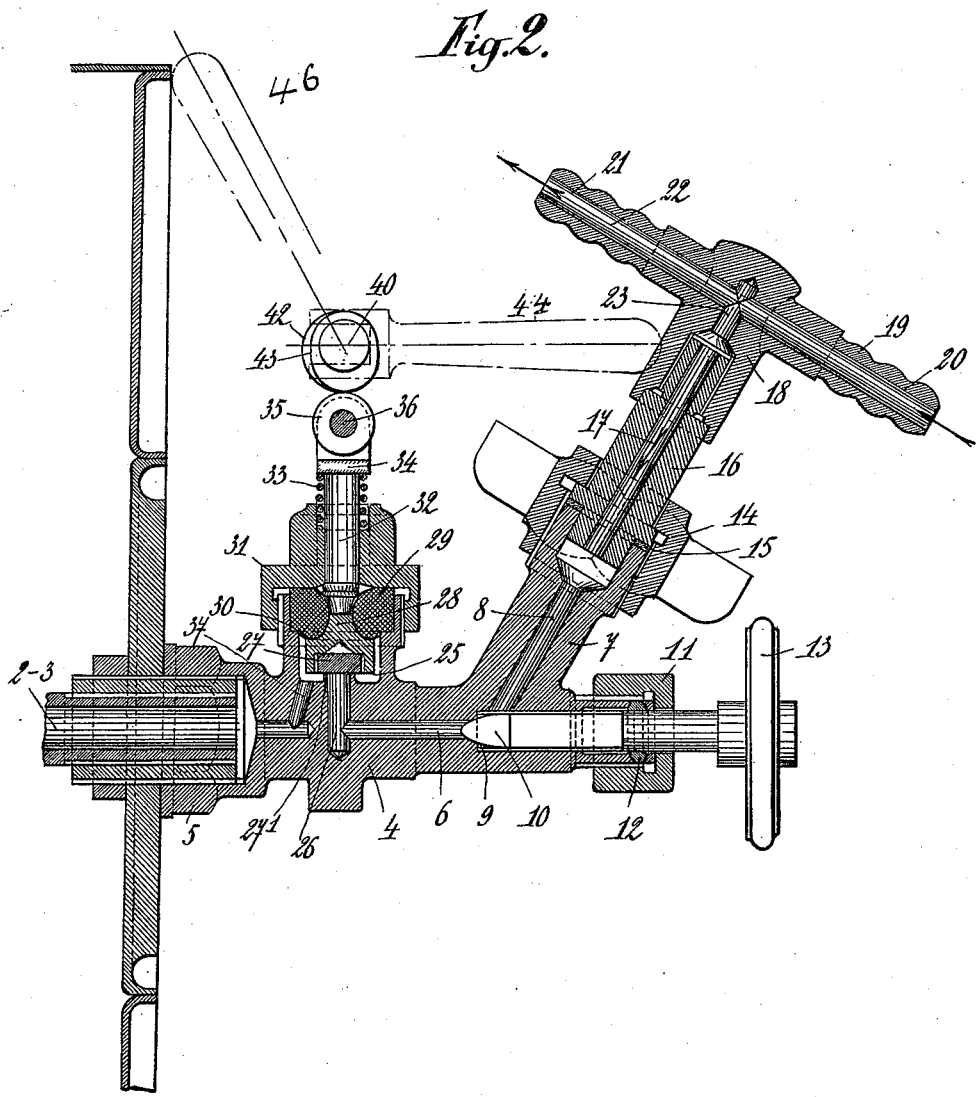

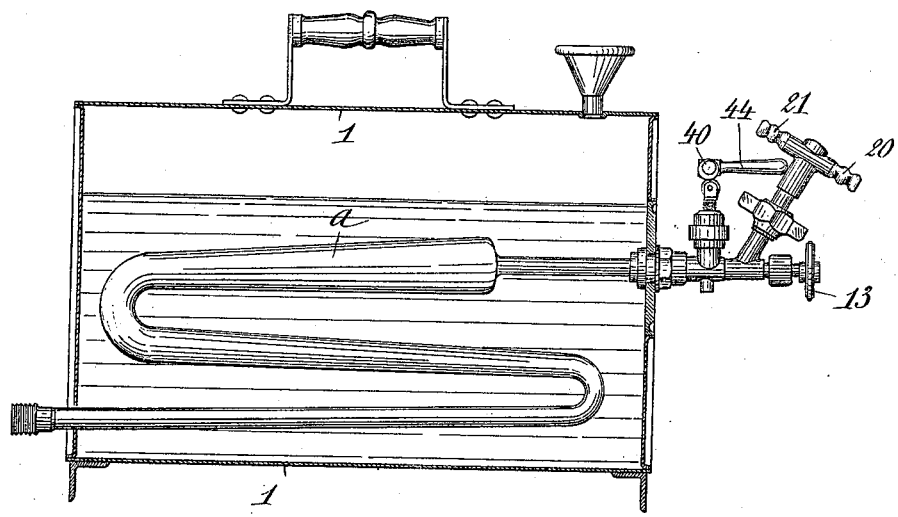
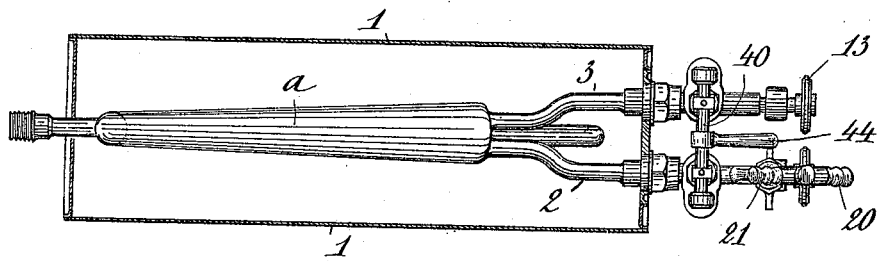

UNITED STATES PATENT OFFICE.

PRIMO LULLI, OF UCCLE, NEAR BRUSSELS, BELGIUM, ASSIGNOR, BY MESNE ASSIGNMENTS, TO THE AMERICAN OXHYDRIC COMPANY, A CORPORATION OF WISCONSIN.

REGULATING DEVICE FOR GAS-MIXERS.

975,444.

Specification of Letters Patent. Patented Nov. 15, 1910.

Application filed March 10, 1908. Serial No. 420,139.

*To all whom it may concern:*

Be it known that I, PRIMO LULLI, a subject of Italy, residing at Uccle, near Brussels, in the Kingdom of Belgium, have invented new and useful Improvements in Regulating Devices for Gas-Mixers, of which the following is a specification.

This invention relates to a regulating device for use in combination with apparatus for mixing gases of the kind described in the U. S. Patent No. 915,714 and more particularly to apparatus of said class which are used in connection with oxyhydrogen blowpipes or oxyacetylene blow-pipes for cutting plates, pipes and the like by means of a heating jet coöperating with an oxygen jet according to the actually well-known method described in the U. S. Patent No. 831,078.

One object of the invention is to allow of uniform regulation of the flame produced at the heating blow-pipe and a further object is to allow of regulating the heating jet at the said heating blow-pipe independently of oxygen or cutting jet, so that the cutting operation can be performed by the aid of a single oxygen regulator.

With these objects in view, the invention essentially consists in a special arrangement of the regulating device combined with the gas mixer and also in special combinations of parts which will be hereinafter fully described, reference being made to the annexed drawings in which:

Figure 1 is an elevation of one end of the mixer showing the regulating members in the position in which they close the two valves or corks regulating the supply of gas to the apparatus. Fig. 2 is a partial longitudinal section of the mixer and oxygen supply pipe. Fig. 3 is a side elevation (some parts being shown in section) of the mixer provided with the regulating device, said device being shown at a reduced scale. Fig. 4 is a top view of the mixer, the casing being shown in horizontal section.

Referring first to Figs. 3 and 4, 1 represents a casing or receptacle of suitable shape forming the ordinary reservoir of a mixer in which the coiled gas pipe $a$ is immersed in water. Oxygen and hydrogen are supplied to this coiled pipe $a$ through pipes 2 and 3 to which are connected the regulating devices forming the subject matter of the present invention. One of these regulating devices shown in section in Fig. 2 comprises a tubular body 4 fixed at 5 to the end of one of the tubes 2 or 3.

The tubular body 4 is in the example illustrated used for the supply of oxygen to an apparatus of known construction for cutting by means of a stream of oxygen. The part 4 is traversed by a conduit 6 and has a branch 7 traversed by a conduit 8. The conduit 8 communicates with the conduit 6 by a chamber 9 in which there is a regulating valve 10 protruding from the part 4. The valve is held by a cover or nut 11 which compresses a packing joint 12. The small wheel 13 on the screw 10 allows of exactly regulating the section of the conduit 6 leading to the tubular part 4. To the branch 7 is fixed by means of a cap 14 and packing 15 a tube 16 traversed by a conduit 17 and having at its upper end a joint 18 of T-shape, the arm 19 of which is traversed by a conduit 20 which can be connected, for example, by a flexible tube to the automatic regulator which regulates the passage of gas from the reservoir. The joint 18 has a branch 21 traversed by a conduit 22 forming an extension of the conduit 20 and by a conduit 23 at right angles to the conduits 20 and 22. The conduit 23 communicates with the conduit 17 in the tube 16; the branch 21 of the joint 18 can be connected to a flexible tube supplying oxygen directly to the cutting apparatus. The supply of hydrogen to the mixer takes place through a tubular part 24 (Fig. 1) analogous to the part which supplies the oxygen, but since hydrogen need only be supplied to the mixer the T-shaped joint 18 is dispensed with and direct communication of the branch 7 to the hydrogen reservoir is provided. Each of the tubular parts 4 and 24 has a chamber 25 communicating by a vertical conduit 26 with the conduit 6, the orifice of which is regulated by the screw 10. In the chamber 25 there is a valve 27 consisting, for example, of a piece of hardened rubber, ebonite, fiber, or the like, resting on a seat $27^1$ and inclosed by a housing 28 supported by a plug of rubber 29 resting upon a seat 30. The chamber 25 is closed by a screw cover 31 traversed by rod 32, the lower end of which abuts against the part 28. The elasticity of the india-rubber plug 29 tends to remove the valve 27 from the orifice of the conduit 26. The rod 32 is acted on by a spring 33 seated in a recess of the cap 31 and abutting against the fork 34 which supports a roller 35 mounted on a gudgeon 36. The orifices of the conduits 26 are thus normally open and give passage of gas from the conduits to the chambers 25 from which the gas flows through conduits 37 to the pipes 2 and 3 which conduct it to the mixer.

To allow of cutting off the supply of gas to the mixer, the screw covers 31 have lateral projections 38 (Fig. 1) on which are pillars 39 supporting a horizontal shaft 40. To the latter are fixed cams 42 and 43 and a hand lever 44. When the lever is depressed, as shown in Fig. 1, the cams close the valves 27 and prevent the flow of gas to the mixer. When the lever is rotated through 90° into the horizontal position, indicated in dotted lines Fig. 2, the shorter radius of the cam 43 acts on the adjacent roller 35 and thus allows the spring 33 to lift the rod 32 so that the valve 27 is opened by the action of the rubber plug 29 and spring 33. Hydrogen can thus flow to the mixer while the cam 42 is still closing the oxygen supply orifice. When the lever is moved into the position indicated by dotted lines 46 in Fig. 2 the supply orifices for hydrogen and oxygen are both open.

When the mixture is used for feeding an apparatus which cuts by means of a stream of oxygen independent of the heating flame, the automatic regulator is adjusted to feed the oxygen at the pressure required for the cutting operation. Independently of this, the supply of oxygen required for feeding the heating flame is regulated by means of the screw 10. The supply of hydrogen is regulated in a corresponding manner by means of the automatic regulator or by means of the regulating screw 10, if there is one corresponding to that which is used for controlling the oxygen. Oxygen from the reservoir flows at the desired pressure through the conduits 20 and 22 directly to the cutting apparatus. A certain proportion of oxygen flows through the conduits 23, 17 and 8 to the conduit 6 leading to the mixer; by operating the lever 44 in the manner described, the two orifices admitting oxygen and hydrogen to the mixer can be opened. It will be seen, that the regulation of the heating flame fed by the mixture remains unaltered by the operation of opening and closing the ordinary supply orifices. Moreover, the oxygen supply is regulated by means of a single regulator instead of by two.

The apparatus can be used at an indefinite distance from the reservoirs and the mixer is easily portable.

Having thus described my invention, what I claim is:

1. In an apparatus for controlling the flow of fluids to burners, a pair of pipes having valves, valve members normally resiliently impelled to open said valves, a shaft having a pair of cams, means for rocking said shaft to positively close said valves separately, and additional separate means for cutting off the flow of fluid individually in said pipes.

2. In a device of the character described, in combination a gas mixer, an oxygen supply pipe, a hydrogen supply pipe, both pipes being connected to the gas mixer, means for regulating the supply of gas to each pipe, a valve interposed in each supply pipe between the gas mixer and the supply regulating means, said valve comprising a rubber plug, a piece of hardened material located in said plug a rod adapted to act on the rubber plug, a spring surrounding said rod and a roller at the end of the said rod; a shaft extending horizontally above the valve rods, bearings for said shaft and cams on said shaft, the said cams being related to each other so as to open the valves in a predetermined order on rotation of the cam shaft substantially as described.

3. In a device of the character described in combination, a gas mixer, an oxygen supply pipe, a hydrogen supply pipe, both pipes being connected to the gas mixer, means for regulating the supply of gas to each pipe, a valve interposed in each supply pipe between the gas mixer and the supply regulating means, a single actuating device for both oxygen and hydrogen valves, whereby said valves are adapted to be opened in a predetermined order and a branch 21 on the oxygen supply pipe whereby oxygen can be supplied directly to a cutting apparatus substantially as and for the purpose described.

4. In a device of the character described in combination a gas mixer, an oxygen supply pipe, a hydrogen supply pipe, both pipes being connected to the gas mixer, a regulating device interposed in the oxygen supply pipe, the said regulating device comprising a tubular body 4, a branch 7 provided on said tubular body, a chamber 9 at the junction of said branch 7 and tubular body 4, a regulating screw 10 acting in said chamber, a gas supply 18—19 connected to the branch 7, a branch 21 provided on said gas supply 18—19, a valve 27 located in a chamber 25 of the tubular body 4 and a spring actuated rod 32 for said valve; a regulating device interposed in the hydrogen supply pipe, the said device comprising a tubular body 4, means for regulating the supply of gas to said tubular body and a valve substantially similar to the valve 27 of the oxygen regulating device and a single actuating device for both oxygen and hydrogen valves, whereby the said valves are adapted to be opened and closed in a predetermined order, substantially as and for the purpose described.

In testimony whereof I have signed my name to this specification in the presence of two subscribing witnesses.

PRIMO LULLI.

Witnesses:
　JAMES M. G. FAY,
　GEORGE BEDE.